United States Patent
Nakamura et al.

(10) Patent No.: US 9,268,751 B2
(45) Date of Patent: *Feb. 23, 2016

(54) INFORMATION DISTRIBUTION SYSTEM, SERVICE-PROVIDING METHOD FOR AN INFORMATION DISTRIBUTION SYSTEM, AND A PROGRAM FOR THE SAME

(71) Applicant: Seiko Epson Corporation, Tokyo (JP)

(72) Inventors: Hideo Nakamura, Shiojiri (JP); Shoji Ono, Matsumoto (JP); Tadashi Furuhata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 183 days.

This patent is subject to a terminal disclaimer.

(21) Appl. No.: 13/848,405

(22) Filed: Mar. 21, 2013

(65) Prior Publication Data

US 2013/0268845 A1 Oct. 10, 2013

Related U.S. Application Data

(63) Continuation of application No. 12/607,242, filed on Oct. 28, 2009, now Pat. No. 8,433,992.

(30) Foreign Application Priority Data

Oct. 28, 2008 (JP) ................................. 2008-276432

(51) Int. Cl.
*G06F 17/20* (2006.01)
*G06F 17/22* (2006.01)
*G06F 17/30* (2006.01)

(52) U.S. Cl.
CPC ........ *G06F 17/2247* (2013.01); *G06F 17/2264* (2013.01); *G06F 17/30914* (2013.01)

(58) Field of Classification Search
CPC ... G06F 17/2247; G06F 17/24; G06F 17/211; G06F 17/30914; G06F 17/2264
See application file for complete search history.

(56) References Cited

U.S. PATENT DOCUMENTS

| 5,128,862 A | 7/1992 | Mueller |
| 5,933,498 A | 8/1999 | Schneck et al. |

(Continued)

FOREIGN PATENT DOCUMENTS

| JP | 2000-242594 A | 9/2000 |
| JP | 2001-016202 A | 1/2001 |

(Continued)

OTHER PUBLICATIONS

Han et al., WebSplitter: A Unified XML Framework for Multi-Device Collaborative Web Browsing, ACM 2000, pp. 221-230.

(Continued)

*Primary Examiner* — Stephen Hong
*Assistant Examiner* — Shahid Khan
(74) *Attorney, Agent, or Firm* — Nutter McClennen & Fish LLP; John J. Penny, Jr.; Derek Roller

(57) ABSTRACT

An information distribution system reduces the effort required to change an application in conjunction with changes in process content and changes in the receiver type or specifications while also accommodating broadcast processes. A style sheet database stores a plurality of output style sheets, which are information conversion rules including conditional expressions related to information distribution. An integrated device control service acquires output data and receiver information specifying the address of the receiver and the output style sheet corresponding to said receiver. When the output data satisfies the conditional expression contained in the output style sheet, the integrated device control service distributes converted output data, which is the output data converted based on the output style sheet, to the address of the receiver.

13 Claims, 15 Drawing Sheets

(56) References Cited

U.S. PATENT DOCUMENTS

| | | | |
|---|---|---|---|
| 6,510,434 B1 * | 1/2003 | Anderson | G06F 17/3061 |
| 6,589,291 B1 | 7/2003 | Boag et al. | |
| 6,615,253 B1 | 9/2003 | Bowman-Amuah | |
| 6,618,062 B1 | 9/2003 | Brown et al. | |
| 6,668,354 B1 | 12/2003 | Chen et al. | |
| 6,764,009 B2 | 7/2004 | Melick et al. | |
| 6,792,577 B1 | 9/2004 | Kimoto | |
| 6,799,299 B1 | 9/2004 | Li et al. | |
| 6,816,879 B1 | 11/2004 | Kiritzov et al. | |
| 7,020,839 B1 | 3/2006 | Hosoda | |
| 7,117,227 B2 | 10/2006 | Call | |
| 7,142,883 B2 | 11/2006 | Rouse et al. | |
| 7,146,564 B2 | 12/2006 | Kim et al. | |
| 7,146,614 B1 | 12/2006 | Nikols et al. | |
| 7,197,461 B1 | 3/2007 | Eberle et al. | |
| 7,228,497 B2 | 6/2007 | Lander | |
| 7,267,279 B2 | 9/2007 | Melick et al. | |
| 7,274,474 B2 | 9/2007 | Yamaguchi et al. | |
| 7,359,940 B2 | 4/2008 | Shi | |
| 7,380,206 B1 * | 5/2008 | Usuda | H04H 20/28 348/E5.104 |
| 7,467,101 B2 | 12/2008 | Kanisawa et al. | |
| 7,506,249 B2 | 3/2009 | Kinno et al. | |
| 7,530,017 B2 | 5/2009 | Kinno et al. | |
| 7,565,612 B2 | 7/2009 | Schelvis et al. | |
| 7,590,381 B2 | 9/2009 | Zink et al. | |
| 7,596,523 B2 | 9/2009 | Sobel et al. | |
| 7,616,335 B2 | 11/2009 | Yamaguchi et al. | |
| 7,664,827 B2 | 2/2010 | Kamata et al. | |
| 7,743,388 B2 | 6/2010 | Nikols et al. | |
| 8,112,544 B2 | 2/2012 | Rouse et al. | |
| 8,255,356 B2 | 8/2012 | Ushiku | |
| 8,433,992 B2 | 4/2013 | Nakamura et al. | |
| 8,504,647 B2 | 8/2013 | Nakamura et al. | |
| 8,682,712 B2 | 3/2014 | Khopkar et al. | |
| 8,880,646 B2 | 11/2014 | Nakamura et al. | |
| 2001/0016880 A1 * | 8/2001 | Cai | H04L 67/2823 719/321 |
| 2002/0010715 A1 | 1/2002 | Chinn et al. | |
| 2002/0104092 A1 | 8/2002 | Arai et al. | |
| 2002/0108115 A1 | 8/2002 | Palmer | |
| 2002/0161745 A1 | 10/2002 | Call | |
| 2002/0169858 A1 | 11/2002 | Bellinger et al. | |
| 2002/0171857 A1 | 11/2002 | Hisatomi et al. | |
| 2002/0171868 A1 | 11/2002 | Yoshimura et al. | |
| 2003/0037303 A1 | 2/2003 | Bodlaender et al. | |
| 2003/0084405 A1 * | 5/2003 | Ito | G06F 17/30896 715/236 |
| 2003/0164957 A1 | 9/2003 | Komaki | |
| 2003/0229529 A1 | 12/2003 | Mui et al. | |
| 2004/0008370 A1 | 1/2004 | Keane et al. | |
| 2004/0064469 A1 | 4/2004 | Takahashi et al. | |
| 2004/0139463 A1 | 7/2004 | Aratani et al. | |
| 2004/0205566 A1 | 10/2004 | Aggarwal et al. | |
| 2004/0261010 A1 | 12/2004 | Matsuishi | |
| 2005/0086117 A1 | 4/2005 | Kanisawa et al. | |
| 2005/0099647 A1 | 5/2005 | Aichi | |
| 2005/0144557 A1 | 6/2005 | Li et al. | |
| 2005/0201623 A1 | 9/2005 | Jang et al. | |
| 2005/0256834 A1 | 11/2005 | Millington et al. | |
| 2005/0278616 A1 | 12/2005 | Eller | |
| 2006/0011720 A1 | 1/2006 | Call | |
| 2006/0087668 A1 | 4/2006 | Takahashi | |
| 2006/0221368 A1 | 10/2006 | Higuchi | |
| 2006/0224702 A1 | 10/2006 | Schmidt et al. | |
| 2006/0235882 A1 | 10/2006 | Mateescu et al. | |
| 2006/0265689 A1 * | 11/2006 | Kuznetsov | G06F 9/546 717/117 |
| 2007/0103726 A1 | 5/2007 | Iwata et al. | |
| 2007/0130513 A1 | 6/2007 | Slein et al. | |
| 2007/0192716 A1 | 8/2007 | Hamada | |
| 2007/0198968 A1 | 8/2007 | Shenfield et al. | |
| 2008/0017714 A1 | 1/2008 | Melick et al. | |
| 2008/0022107 A1 | 1/2008 | Pickles et al. | |
| 2008/0028101 A1 | 1/2008 | Dewa | |
| 2008/0056663 A1 | 3/2008 | Tsujii et al. | |
| 2008/0129864 A1 | 6/2008 | Stone et al. | |
| 2008/0148147 A1 | 6/2008 | Poston et al. | |
| 2008/0161956 A1 | 7/2008 | Tohgi et al. | |
| 2008/0178072 A1 | 7/2008 | Fiedorowicz et al. | |
| 2008/0228608 A1 | 9/2008 | Kurahashi et al. | |
| 2008/0309973 A1 | 12/2008 | Okamoto | |
| 2009/0112901 A1 | 4/2009 | Friedman | |
| 2009/0113289 A1 | 4/2009 | Zhang et al. | |
| 2009/0119329 A1 | 5/2009 | Kwon et al. | |
| 2009/0192716 A1 | 7/2009 | Molenaar | |
| 2009/0228782 A1 | 9/2009 | Fraser | |
| 2010/0085954 A1 | 4/2010 | Keshavarzian et al. | |
| 2010/0100606 A1 | 4/2010 | Nakamura et al. | |
| 2010/0100925 A1 | 4/2010 | Hinton | |
| 2010/0107057 A1 | 4/2010 | Nakamura et al. | |
| 2010/0166165 A1 | 7/2010 | Langseth et al. | |
| 2011/0283182 A1 | 11/2011 | Miller et al. | |
| 2012/0127490 A1 | 5/2012 | Ogasawara et al. | |
| 2012/0215581 A1 | 8/2012 | Schmidt et al. | |
| 2013/0232406 A1 | 9/2013 | Sampathkumar et al. | |
| 2013/0238764 A1 | 9/2013 | Nakamura et al. | |
| 2013/0238981 A1 | 9/2013 | Nakamura et al. | |
| 2013/0268845 A1 | 10/2013 | Nakamura et al. | |
| 2013/0268846 A1 | 10/2013 | Nakamura et al. | |

FOREIGN PATENT DOCUMENTS

| | | |
|---|---|---|
| JP | 2002-108632 A | 4/2002 |
| JP | 2002-312280 A | 10/2002 |
| JP | 2003-036159 A | 2/2003 |
| JP | 2003-216639 A | 7/2003 |
| JP | 2003-241926 A | 8/2003 |
| JP | 2003-280849 A | 10/2003 |
| JP | 2004-102480 A | 4/2004 |
| JP | 2004-288023 A | 10/2004 |
| JP | 2004-318842 A | 11/2004 |
| JP | 2005-044304 A | 2/2005 |
| JP | 2007-072959 A | 3/2007 |

OTHER PUBLICATIONS

Nogueras-Iso et al., Metadata Standard Inoperability: Application in the Geographic Information Domain, Google 2004, pp. 611-634.
Office Action dated Oct. 7, 2011 in U.S. Appl. No. 12/607,242.
Office Action dated Feb. 2, 2012 in U.S. Appl. No. 12/607,242.
Office Action dated Mar. 28, 2012 in U.S. Appl. No. 12/582,303.
Notice of Allowance dated Jun. 8, 2012 in U.S. Appl. No. 12/582,303.
Office Action dated Jul. 25, 2012 in U.S. Appl. No. 12/607,242.

\* cited by examiner

<XML DOCUMENT 1: OUTPUT DATA>

ORDER INFORMATION
(1 DRAFT BEER, 1 SIRLOIN STEAK, 1 CAESAR SALAD)

```xml
<?xml version="1.0" encoding="UTF-8" ?>
<Order>
    <Transaction>
        <CustomerOrderTransaction>
            <LineItem>
                <SequenceNumber>1</SequenceNumber>
                <Sale>
                    <ItemID>101</ItemID>
                    <Description> draft beer </Description>
                    <Quantity>1</Quantity>
                </Sale>
            </LineItem>
            <LineItem>
                <SequenceNumber>2</SequenceNumber>
                <Sale>
                    <ItemID>202</ItemID>
                    <Description> sirloin steak </Description>
                    <Quantity>1</Quantity>
                </Sale>
            </LineItem>
            <LineItem>
                <SequenceNumber>3</SequenceNumber>
                <Sale>
                    <ItemID>303</ItemID>
                    <Description> caesar salad </Description>
                    <Quantity>1</Quantity>
                </Sale>
            </LineItem>
        </CustomerOrderTransaction>
    </Transaction>
</Order>
```

101 → <CustomerOrderTransaction>

FIG. 6

<XML DOCUMENT 1: DISTRIBUTION INFORMATION>

```
<?xml version="1.0" encoding="UTF-8"?>
<Execute>
    <Device>
        <Name>KitchenPrinter1</Name>
        <Stylesheet>KitchenPrinter1_Meat.xsl</Stylesheet>
        <Timeout>10000</Timeout>
        <Device>
            <Name>KitchenPrinter2</Name>
            <Stylesheet>KitchenPrinter2_Meat.xsl</Stylesheet>
            <Timeout>10000</Timeout>
            <Device>
                <Name>KitchenPrinter3</Name>
                <Stylesheet>KitchenPrinter3_Meat.xsl</Stylesheet>
                <Timeout>10000</Timeout>
            </Device>
        </Device>
    </Device>
    <Device>
        <Name>KitchenPrinter4</Name>
        <Stylesheet>KitchenPrinter4_Salad.xsl</Stylesheet>
        <Timeout>10000</Timeout>
        <Device>
            <Name>KitchenPrinter5</Name>
            <Stylesheet>KitchenPrinter5_Salad.xsl</Stylesheet>
            <Timeout>10000</Timeout>
        </Device>
    </Device>
    <Device>
        <Name>KitchenPrinter6</Name>
        <Stylesheet>KitchenPrinter6_Drink.xsl</Stylesheet>
        <Timeout>10000</Timeout>
        <Device>
            <Name>KitchenPrinter7</Name>
            <Stylesheet>KitchenPrinter7_Drink.xsl</Stylesheet>
            <Timeout>10000</Timeout>
        </Device>
    </Device>
</Execute>
```

Labels: 111 → first `<Device>` (KitchenPrinter1); 112 → `<Device>` (KitchenPrinter4); 113 → `<Device>` (KitchenPrinter6)

FIG. 7

<OUTPUT STYLE SHEET>
STYLE SHEET FOR KITCHEN PRINTER IN DRINK DEPARTMENT

```xml
<?xml version="1.0" encoding="UTF-8"?>
<xsl:stylesheet version="1.0" xmlns:xsl="http://www.w3.org/1999/XSL/Transform">
    <xsl:output method="xml" encoding="UTF-8"/>

<xsl:template match="/">
        <xsl:apply-templates select=".//Sale"/>
    </xsl:template>

121→<xsl:template match="Sale">
        <xsl:variable name="MenuID" select=".//ItemID"/>
        <xsl:if test="$MenuID >= 100 and $MenuID < 200">
            <Print>
                <Data>
                    ORDER RECEIVED:
                    <xsl:value-of select=".//Description"/>
                    <xsl:value-of select=".//Quantity"/> PLEASE
                </Data>
            </Print>
        </xsl:if>
    </xsl:template>

</xsl:stylesheet>
```

FIG. 8A

<XML DOCUMENT 2>
OUTPUT TO KITCHEN PRINTER IN DRINK DEPARTMENT

```xml
<?xml version="1.0" encoding="UTF-8"?>
122→<Print>
    <Data>
        ORDER RECEIVED: DRAFT BEER   1 PLEASE
    </Data>
</Print>
```

FIG. 8B

<OUTPUT STYLE SHEET>
STYLE SHEET FOR KITCHEN PRINTER IN GRILL DEPARTMENT

```
<?xml version="1.0" encoding="UTF-8"?>
<xsl:stylesheet version="1.0" xmlns:xsl="http://www.w3.org/1999/XSL/Transform">
    <xsl:output method="xml" encoding="UTF-8"/>

<xsl:template match="/">
        <xsl:apply-templates select=".//Sale"/>
    </xsl:template>

123 →<xsl:template match="Sale">
        <xsl:variable name="MenuID" select=".//ItemID"/>
        <xsl:if test="$MenuID >= 200 and $MenuID < 300">
            <Print>
                <Data>
                    ORDER RECEIVED:
                    <xsl:value-of select=".//Description"/>
                    <xsl:value-of select=".//Quantity"/> PLEASE
                </Data>
            </Print>
        </xsl:if>
    </xsl:template>

</xsl:stylesheet>
```

FIG. 9A

<XML DOCUMENT 2>
OUTPUT TO KITCHEN PRINTER IN GRILL DEPARTMENT

```
<?xml version="1.0" encoding="UTF-8"?>
124 →<Print>
    <Data>
        ORDER RECEIVED: SIRLOIN STEAK   1 PLEASE
    </Data>
</Print>
```

FIG. 9B

<OUTPUT STYLE SHEET>
STYLE SHEET FOR KITCHEN PRINTER IN SALAD DEPARTMENT

```
<?xml version="1.0" encoding="UTF-8"?>
<xsl:stylesheet version="1.0" xmlns:xsl="http://www.w3.org/1999/XSL/Transform">
    <xsl:output method="xml" encoding="UTF-8"/>

<xsl:template match="/">
        <xsl:apply-templates select=".//Sale"/>
    </xsl:template>

125 <xsl:template match="Sale">
        <xsl:variable name="MenuID" select=".//ItemID"/>
        <xsl:if test="$MenuID >= 300 and $MenuID < 400">
            <Print>
                <Data>
                    ORDER RECEIVED:
                    <xsl:value-of select=".//Description"/>
                    <xsl:value-of select=".//Quantity"/> PLEASE
                </Data>
            </Print>
        </xsl:if>
    </xsl:template>

</xsl:stylesheet>
```

FIG. 10A

<XML DOCUMENT 2>
OUTPUT TO KITCHEN PRINTER IN SALAD DEPARTMENT

```
<?xml version="1.0" encoding="UTF-8"?>
126 <Print>
        <Data>
            ORDER RECEIVED: CAESAR SALAD   1 PLEASE
        </Data>
    </Print>
```

FIG. 10B

<XML DOCUMENT 4: DISTRIBUTION RESULT>

```
<?xml version="1.0" encoding="UTF-8"?>
<ExecuteResponse>
    <Device>                                                    ← 131
        <Name>KitchenPrinter1</Name>
        <Response ResponseCode="Rejected">
            <BusinessError Severity="Error">
                <Code>DeviceNotFound</Code>
                <Description>The device has not worked successfully.</Description>
            </BusinessError>
        </Response>
        <Device>
            <Name>KitchenPrinter2</Name>
            <Response ResponseCode="Rejected">
                <BusinessError Severity="Error">
                    <Code>DeviceTimeout</Code>
                    <Description>The device has not worked successfully.</Description>
                </BusinessError>
            </Response>
            <Device>
                <Name>KitchenPrinter3</Name>
                <Response ResponseCode="OK">
                    <BusinessError Severity="Information">
                        <Code>DeviceSuccess</Code>
                        <Description>The device has worked successfully.</Description>
                    </BusinessError>
                </Response>
            </Device>
        </Device>
    </Device>
    <Device>                                                    ← 132
        <Name>KitchenPrinter4</Name>
        <Response ResponseCode="OK">
            <BusinessError Severity="Information">
                <Code>DeviceSuccess</Code>
                <Description>The device has worked successfully.</Description>
            </BusinessError>
        </Response>
    </Device>
    <Device>                                                    ← 133
        <Name>KitchenPrinter6</Name>
        <Response ResponseCode="OK">
            <BusinessError Severity="Information">
                <Code>DeviceSuccess</Code>
                <Description>The device has worked successfully.</Description>
            </BusinessError>
        </Response>
    </Device>
</Execute>
```

FIG. 11

<SUBSTITUTE OUTPUT STYLE SHEET>
STYLE SHEET FOR OUTPUTTING FROM DRINK DEPARTMENT
TO KITCHEN PRINTER IN ANOTHER DEPARTMENT

```xml
<?xml version="1.0" encoding="UTF-8"?>
<xsl:stylesheet version="1.0" xmlns:xsl="http://www.w3.org/1999/XSL/Transform">
    <xsl:output method="xml" encoding="UTF-8"/>

<xsl:template match="/">
        <xsl:apply-templates select=".//Sale"/>
    </xsl:template>

<xsl:template match="Sale">                              ← 141
        <xsl:variable name="MenuID" select=".//ItemID"/>
        <xsl:if test="$MenuID >= 100 and $MenuID < 200">
            <Print>
                <Data>
                    ORDER RECEIVED: PLEASE DELIVER TO DRINK DEPARTMENT!
                    <xsl:value-of select=".//Description"/>
                    <xsl:value-of select=".//Quantity"/> PLEASE
                </Data>
            </Print>
        </xsl:if>
    </xsl:template>

</xsl:stylesheet>
```

FIG. 13A

<XML DOCUMENT 2 (IN SUBSTITUTION PROCESS)>
OUTPUT TO KITCHEN PRINTER IN DEPARTMENT OTHER
THAN THE DRINK DEPARTMENT

```xml
<?xml version="1.0" encoding="UTF-8"?>
<Print>                                                      ← 142
    <Data>
        ORDER RECEIVED: PLEASE DELIVER TO DRINK DEPARTMENT!
        DRAFT BEER 1 PLEASE
    </Data>
</Print>
```

FIG. 13B

<OUTPUT STYLE SHEET>
DISPENSER STYLE SHEET FOR THE DRINK DEPARTMENT

```
<?xml version="1.0" encoding="UTF-8"?>
<xsl:stylesheet version="1.0"
    xmlns:xsl="http://www.w3.org/1999/XSL/Transform">
    <xsl:output method="xml" encoding="UTF-8"/>

<xsl:template match="/">
        <xsl:apply-templates select=".//Sale"/>
    </xsl:template>

<xsl:template match="Sale">
        <xsl:variable name="MenuID" select=".//ItemID"/>
        <xsl:if test="$MenuID >= 100 and $MenuID < 200">
            <Vend>
                <Pour>
                    <xsl:value-of select=".//Description"/>
                    <xsl:value-of select=".//Quantity"/>
                </Pour>
            </Vend>
        </xsl:if>
    </xsl:template>

</xsl:stylesheet>
```

151 → (points to `<xsl:template match="Sale">`)

FIG. 14A

<XML DOCUMENT 2>
OUTPUT TO DRINK DISPENSER IN DRINK DEPARTMENT

```
<?xml version="1.0" encoding="UTF-8"?>
<Vend>
    <Pour>DRAFT BEER  1 /Pour>
</Vend>
```

152 → (points to `<Vend>`)

FIG. 14B

<SUBSTITUTE OUTPUT STYLE SHEET>
STYLE SHEET FOR KITCHEN DISPLAY IN DRINK DEPARTMENT

```
<?xml version="1.0" encoding="UTF-8"?>
<xsl:stylesheet version="1.0" xmlns:xsl="http://www.w3.org/1999/XSL/Transform">
    <xsl:output method="html" encoding="UTF-8"/>

<xsl:template match="/">
        <xsl:apply-templates select=".//Sale"/>
    </xsl:template>

<xsl:template match="Sale">
        <xsl:variable name="MenuID" select=".//ItemID"/>
        <xsl:if test="$MenuID >= 100 and $MenuID < 200">
            <html>
                <body>
                    ORDER RECEIVED:
                    <xsl:value-of select=".//Description"/>
                    <xsl:value-of select=".//Quantity"/> PLEASE
                </body>
            </html>
        </xsl:if>
    </xsl:template>

</xsl:stylesheet>
```

<XML DOCUMENT 2 (IN SUBSTITUTION PROCESS)>
OUTPUT TO KITCHEN DISPLAY IN DRINK DEPARTMENT

162

```
<html>
  <body> ORDER RECEIVED: DRAFT BEER  1 PLEASE</body>
</html>
```

FIG. 15B

INFORMATION DISTRIBUTION SYSTEM, SERVICE-PROVIDING METHOD FOR AN INFORMATION DISTRIBUTION SYSTEM, AND A PROGRAM FOR THE SAME

This application is a continuation of U.S. patent application Ser. No. 12/607,242 filed on Oct. 28, 2009, entitled "Information Distribution System, Service-Providing Method For An Information Distribution System, And A Program For The Same," which is hereby incorporated by reference in its entirety.

BACKGROUND

1. Technical Field

The present invention relates to an information distribution system for distributing information between transmitters and receivers, to a service-providing method for an information distribution system, and to a program for the same.

2. Related Art

When information is distributed to a plurality of devices (receivers) such as printers, displays, and card readers that are connected to a computer, an application program (a transmitter, referred to below as simply "application") is installed on the computer and commands are output from the application. In order to cause the plural types of devices to execute a single coordinated process, the application must be written to include processes specific to each device, such as a process instructing a first device to execute an operation and return event information, and another process then instructing a second device to execute an operation and return event information, and writing the application is thus time-consuming.

Japanese Unexamined Patent Appl. Pub. JP-A-2000-242594 therefore teaches a system that inserts a management module between the application and the plural devices. The application sends a device name and process content (process identifier) to the management module, and the management module writes the received content to a table and causes the devices to execute a coordinated process. Because this configuration eliminates the need to write the process content for executing the coordinated process in the application, writing the application is easier. Another advantage is that application changes can be kept to a minimum when the number of devices changes.

When it is necessary to change the format, layout, or print content to be printed by the printer with the system taught in JP-A-2000-242594, however, the application must be changed. When a device is replaced with a different model, the control information (commands) that must be sent also changes and the application must therefore also be changed. The system taught in JP-A-2000-242594 is thus not configured so that changes in process content or differences in device models can be absorbed by the management module.

It is also conceivable that this system may broadcast the same data to a first device and to a second device. However, if the first device and second device are different types of devices, both devices cannot be caused to operate normally when the same data is sent to both. The system may also conditionally broadcast the distributed data so that, for example, the data is sent to the first device when some condition is met and is sent to the second device if the condition is not met, but this system is unable to define the conditions.

SUMMARY

There has therefore been a need for an information distribution system that can reduce the effort required to change an application in conjunction with changes in process content and changes in the receiver type or specifications while also accommodating broadcast processes, a service-providing method for such an information distribution system, and a program for the same.

A first aspect of the invention is an information distribution system that distributes information acquired from a transmitter to a receiver, including: a storage unit that stores a plurality of output style sheets, which are information conversion rules including conditional expressions related to information distribution; an output data acquisition unit that acquires output data from the transmitter; a receiver information acquisition unit that acquires receiver information specifying an address of the receiver to which the output data is distributed and the output style sheet corresponding to said receiver; a condition evaluation unit that determines whether or not the output data satisfies the conditional expression contained in the output style sheet specified by the receiver information; and a distribution unit that distributes converted output data, which is the output data converted based on the output style sheet, to the address specified by the receiver information when the output data satisfies the conditional expression.

A second aspect of the invention is a service-providing method for an information distribution system that manages a database storing a plurality of output style sheets, which are information conversion rules including conditional expressions related to information distribution, and distributes information acquired from a transmitter to a receiver, the service-providing method including as steps that are executed by the information distribution system steps of: acquiring output data from the transmitter; acquiring receiver information specifying an address of the receiver to which the output data is distributed and the output style sheet corresponding to said receiver; determining whether or not the output data satisfies the conditional expression contained in the output style sheet specified by the receiver information; and distributing converted output data, which is the output data converted based on the output style sheet, to the address specified by the receiver information when the output data satisfies the conditional expression.

Because the output data from a transmitter is converted to converted output data based on an output style sheet, this aspect of the invention enables accommodating changes in process content and receiver replacement by rewriting the output style sheet when the process content changes or a receiver is replaced (such as when a device is replaced with a device of a different type or specifications). More specifically, because changes in process content and differences in device type and specifications can be absorbed by the output style sheet, writing the application is easier and the amount of work needed to change an application in conjunction with changes in process content or differences in device type and specifications can be reduced. In addition, because conditional expressions relating to information distribution may be included in the output style sheet, the distribution of output data can be controlled. As a result, the conditional expressions can be set freely by simply rewriting the output style sheet without needing to change the application.

Because the information distribution system could conceivably acquire a plurality of distribution information objects, information describing the distribution information used in the distribution process is preferably also included in the output data object.

Yet further, the distribution information may be acquired from the transmitter of the output data object. In this situation the distribution information and output data may be acquired simultaneously or at a different timing.

In an information distribution system according to another aspect of the invention the receiver information acquisition unit acquires a plurality of receiver information objects, and the plural receiver information objects specify output style sheets each including different conditional expressions.

Because this aspect of the invention can specify output style sheets including different conditional expressions for each receiver, a plurality of receivers to which information is broadcast can be caused to operate normally even when the type or specifications of the receivers differ. Conditional broadcast processes whereby the output data is distributed to a first receiver when a particular condition is met, and is distributed to a second receiver when the condition is not met, can also be executed.

In an information distribution system according to another aspect of the invention the receiver information also specifies an input style sheet of information conversion rules corresponding to the transmitter, and the information distribution system also includes a response unit that inputs converted input data, which is the input data from the receiver converted based on the input style sheet, to the transmitter.

Further preferably, the output data acquisition unit can acquire output data from a plurality of transmitters, and the storage unit stores a plurality of input style sheets corresponding to the plural transmitters.

These aspects of the invention enable the transmitter to acquire input data that is input from the receiver. When the information distribution system is linked to a plurality of transmitters, converted input data appropriate to each transmitter can also be input because input style sheets can be specified for each transmitter.

Yet further preferably, the transmitter is an application, the receiver is a device, and the output data, converted output data, input data, and converted input data are all markup documents.

This aspect of the invention enables applying the invention to an information distribution system that distributes information acquired from an application to devices. XML (eXtensible Markup Language) is an example of a markup document description language. Using XML has several advantages, including ease of design because markup document content can describe functions and design is not dependent on a particular language or culture, and ambiguities in document structure can be eliminated.

In an information distribution system according to another aspect of the invention, the storage unit preferably stores a plurality of output style sheets for converting the output data to converted output data in different description languages, and the receiver includes plural types of devices that can interpret different description languages.

This aspect of the invention enables a single information distribution system to be compatible with plural different types of devices that can interpret different description languages. As a result, information can be broadcast to both a printer and a display, for example. Furthermore, because conditional expressions can be set for each individual device, conditional broadcast processes that conditionally broadcast information to different devices, such as sending the output data only to the display when a particular condition is not met, and sending the output data to both the printer and display when a particular condition is met, can be enabled by simply rewriting the output style sheet without needing to change the application.

Another aspect of the invention is a program that causes a computer to execute the steps of the service-providing method for an information distribution system described above.

By using this program, the amount of work involved with changing an application in conjunction with changes in process content or changes in the type or specifications of the receiver can be reduced, and an information distribution system service that is compatible with broadcast processes can be achieved.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows an example of XML document 1 (output data).

FIG. 7 shows an example of XML document 1 (distribution information).

FIG. 8A shows an example of an output style sheet (drink department).

FIG. 8B shows an example of an XML document 2 based on the output style sheet of FIG. 8A.

FIG. 9A shows an example of an output style sheet (grill department).

FIG. 9B shows an example of an XML document 2 based on the output style sheet of FIG. 9B.

FIG. 10A shows an example of an output style sheet (salad department).

FIG. 10B shows an example of an XML document 2 based on the output style sheet of FIG. 10A.

FIG. 11 shows an example of XML document 4 (distribution result).

FIG. 13A shows an example of a substitute output style sheet.

FIG. 13B shows an example of an XML document 2 based on the output style sheet of FIG. 13A.

FIG. 14A shows an example an output style sheet.

FIG. 14B shows an example an XML document 2 based on the output style sheet of FIG. 14A.

FIG. 15A shows an example of a substitute output style sheet.

FIG. 15B shows an example of an XML document 2 based on the output style sheet of FIG. 15A.

DESCRIPTION OF EMBODIMENTS

A preferred embodiment of the present invention is described below with reference to the accompanying figures.

An information distribution system, a service-providing method for an information distribution system, and a program for the same according to preferred embodiments of the invention are described below with reference to the accompanying figures. The invention centrally converts information acquired from a transmitter (application) to information appropriate to each individual receiver (device) and distributes the converted information to the appropriate devices to centrally control each receiver. The information distribution system of the invention is described below using by way of example an in-house management system deployed in a restaurant or other food service business. Note that this in-house management system is a system that controls different types of devices such as kitchen printers and cooking equipment based on customer order information acquired from an order terminal.

Figure 1:
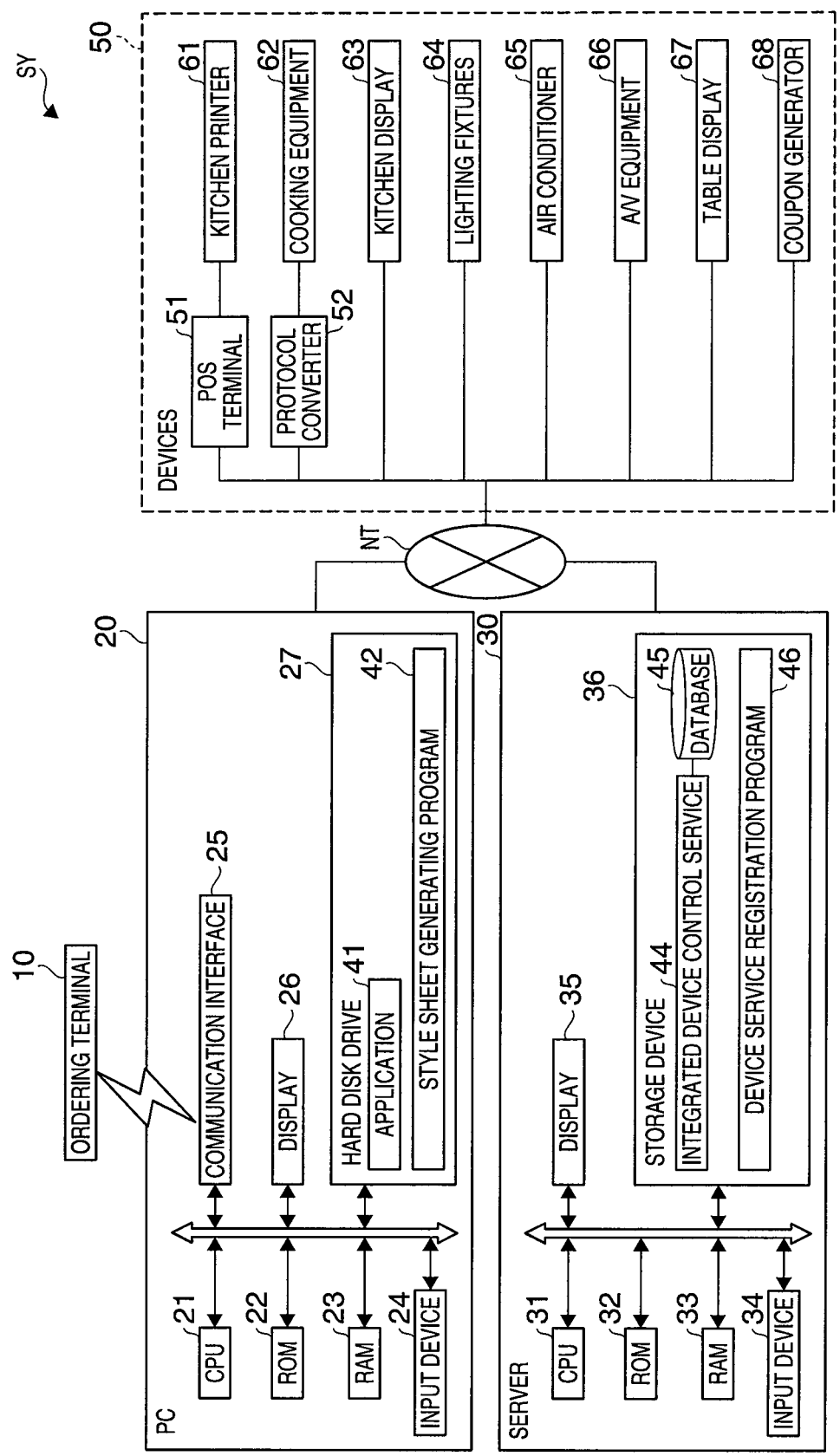
FIG. 1 is a system configuration diagram of an in-house management system.

FIG. 1 is a block diagram of an in-house management system SY according to this embodiment of the invention. The in-house management system SY includes an order terminal 10 for inputting customer orders, a computer 20 (referred to as a "PC" below) that functions as an order terminal, a server 30 (information distribution system) incorporating an integrated device control service 44, and devices 50 such as a kitchen printer 61 and cooking equipment 62. The PC 20, server 30, and devices 50 are connected together through a network NT such as an intranet.

The PC 20 has a CPU (central processing unit) 21, ROM (read-only memory) 22, RAM (random access memory) 23, input device 24, communication interface 25, display 26, and hard disk drive (HDD) 27. The communication interface 25 enables wireless communication with the order terminal 10, and in this embodiment of the invention is used primarily for receiving order information.

The hard disk drive 27 stores an application program 41 (referred to below as simply "application") and a style sheet generating program 42. The application 41 functions as a "transmitter" with respect to the devices 50 (receivers) to which information is distributed. The style sheet generating program 42 is a program that generates style sheets, which define the information conversion rules for server 30 side conversion of information to a format compatible with each particular device 50.

Similarly to the PC 20, the server 30 has the configuration of a general computer, including a CPU 31, ROM 32, RAM 33, input device 34, display 35, and storage device 36. The storage device 36 stores the integrated device control service 44 and device service registration program 46 in addition to a database 45. The style sheets described above and information related to the device control services 73, 75 (see FIG. 2) for the devices 50 are stored in the database 45.

The integrated device control service 44 is an essential component of this embodiment of the invention. The integrated device control service 44 converts information acquired from the PC 20 (application 41) using style sheets read from the database 45 to information appropriate to the devices 50, and outputs to the device control services 73, 75 corresponding to the devices 50.

The device service registration program 46 is a program for registering the presence of the device control services 73, 75 on the network NT in the database 45 so that they can be recognized by the integrated device control service 44.

The devices 50 include, for example, a POS terminal 51 and a kitchen printer 61 connected to the POS terminal 51, a cooking equipment protocol converter 52 and cooking equipment 62 connected to the protocol converter 52, and various other devices with a network NT connection capability (such as a kitchen display 63, lighting fixtures 64, air conditioner 65, audio/visual (A/V) equipment 66, table display 67, and coupon generator 68). The POS terminal 51 and protocol converter 52 function as a "receiver" that receives information distributed from the application 41 to control local devices that cannot be directly connected to the network NT, such as the kitchen printer 61 connected to the POS terminal 51 and the cooking equipment 62 connected to the protocol converter 52.

The in-house management system SY can thus integrally control the devices 50 according to order information output from the order terminal 10. More specifically, when the order information includes an order for the grill department, the kitchen printer 61 installed in the grill department of the kitchen is controlled to issue an order preparation ticket. When the order information includes an order for the drink department, the kitchen printer 61 installed in the drink department of the kitchen is controlled to issue an appropriate order preparation ticket.

Recipe information for the ordered dishes is also displayed on the kitchen display 63, and the lighting fixtures 64 are controlled to select an appropriate fixture (such as indirect lighting or a spot light) based on the order information and illuminate with a brightness determined by the order information.

The in-house management system SY also outputs commands for adjusting the temperature or humidity to the air conditioner 65 according to the order information, and causes the A/V equipment 66 to output video and audio according to the order information at the picture quality and sound quality determined by the order information.

The in-house management system SY also displays the order, information about the ingredients used in the ordered dishes, calorie information, and allergy information, for example, on the table display 67 located at the table where the customer who placed the order is seated, and causes the coupon generator 68 to issue coupons based on the order information.

The in-house management system SY can thus control local devices selected in accordance with one customer order from the group of plural different types of devices 50 that are used in the restaurant. The method enabling the in-house management system SY to accomplish this is described next in detail.

Figure 2:
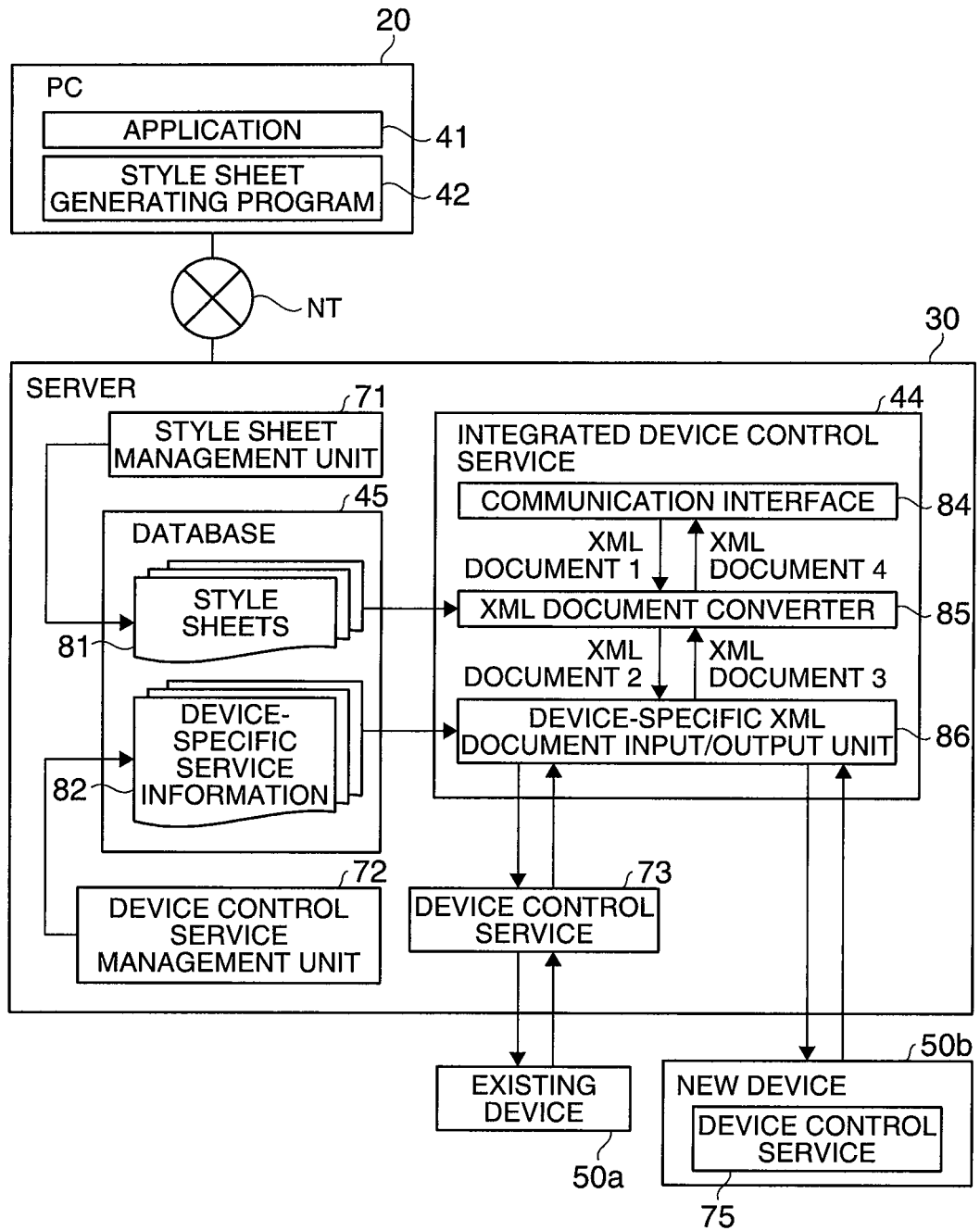
FIG. 2 is a function block diagram of a server.

FIG. 2 is a block diagram showing specific functions of the server 30. In addition to the integrated device control service 44 and database 45 described above, the server 30 has a style sheet management unit 71, device control service management unit 72, and device control service 73 for an existing device 50a.

The style sheet management unit 71 manages the style sheets (including storing, deleting, and changing the style sheets), and supplies a style sheet generating tool (not shown in the figure) enabling easily generating style sheets to the PC 20.

An example of a style sheet generating tool supplied by the style sheet management unit 71 is, for example, a tool that can change the format by only changing predefined items of a style sheet used for conversion to the XMLPOS format in order to print receipts on the kitchen printer 61.

The device control service management unit 72 functions by executing a device service registration program 46 (see FIG. 1), and manages (including storing, deleting, and changing) the device control services 73, 75 on the network NT. The device control service management unit 72 searches and references the device control services 73, 75 using private UDDI (Universal Description, Discovery and Integration).

The device control service 73 is a service for controlling an existing device 50a. When an existing device driver is used, a command conversion module for the existing device driver and an existing driver API (neither of which is shown in the figures) are also needed. It should be noted that some devices 50, such as devices that have an internal device control service 75, do not require a device control service 73 in the server 30. Such devices 50 (referred to below as "new device 50b") can communicate directly with the integrated device control service 44 for data input and output. If services are defined using the Web Services Description Language (WSDL), the device control service 75 may be located in either the devices 50 or the PC 20.

The database 45 includes a style sheet database 81 (storage unit) that stores style sheets, and a device-specific service information database 82 that stores information related to the device control services 73, 75 ("device-specific service information" below).

The style sheet database 81 stores style sheets acquired from the PC 20 (the style sheets registered by the style sheet management unit 71). These style sheets are written in the eXtensible Stylesheet Language (XSL).

The device-specific service information database 82 stores the device-specific service information registered by the device control service management unit 72. The device-specific service information is written in WSDL.

The integrated device control service 44 includes a communication interface 84, XML (eXtensible Markup Language) document converter 85, and device-specific XML document input/output unit 86.

Note that the output data acquisition unit, the receiver information acquisition unit, the condition evaluation unit, the distribution unit, and the response unit in the accompanying claims are rendered by the integrated device control service 44.

The integrated device control service 44 primarily executes an information distribution process that distributes information from the PC 20, and a response process from the devices 50 (existing device 50a and new device 50b).

Note, further, that in the information distribution process the information supplied from the application 41 or other transmitter is referred to below as the "distribution information." When supplied from the application 41, this distribution information can be acquired simultaneously to the output data from the application 41 (that is, attached to the output data). The information input from the devices 50 in the response process is called the "distribution result."

For example, when the information distribution process executes, the communication interface 84 acquires distribution information including the output data (order information) from the application 41 and information related to the target device to which the output data is addressed (the receiver to which the information is distributed) and the style sheet for outputting data to that receiver (the "output style sheet"). This information is written in XML, and is referred to below as XML document 1.

The XML document converter 85 converts the XML document 1 acquired from the communication interface 84 to an XML document (referred to as XML document 2 (converted output data)) containing device control commands (device control information) for the target device based on the output style sheet read from the style sheet database 81. Note that the XML document converter 85 converts the XML document using an XSL Transformation (XSLT).

The device-specific XML document input/output unit 86 outputs the XML document 2 acquired from the XML document converter 85 to the device control services 73, 75 corresponding to the target device.

When the response process executes, the device-specific XML document input/output unit 86 inputs an XML document including the distribution result (input data) from each device 50 ("XML document 3") to the XML document converter 85.

The XML document converter 85 converts the input XML document 3 to an XML document for the application 41 ("XML document 4 (converted input data)" below) based on the style sheet for data input (the "input style sheet" below) read from the style sheet database 81. The communication interface 84 then inputs the XML document 4 acquired from the XML document converter 85 to the application 41.

Referring to the domain model shown in FIG. 3, the "distribution information" class used in the information distribution process and the "distribution result" class used in the response process are described in detail. Note that the square brackets added to each information class denote multiplicity. Multiplicity is a term used in the Unified Modeling Language (UML), and denotes the number of attributes in the distribution information or other information object. Examples of multiplicity include the following.

[1] The number of attributes is 1.

[1 ... *] The number of attributes is greater than or equal to 1.

[0 ... 1] The number of attributes is greater than or equal to 0 and less than 1.

[0 ... *] The number of attributes is greater than or equal to 0.

Figure 3A:
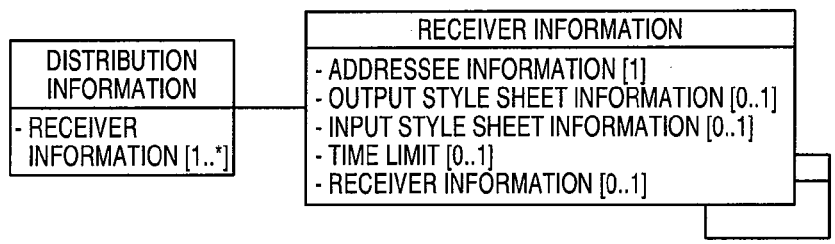
FIG. 3A describes the distribution information.

As shown in FIG. 3A, the distribution information class has one or more "receiver information" attributes ("first receiver information" below). By defining a plurality of receiver information attributes, the application 41 can broadcast one unit of output data to a plurality of receivers (broadcast process). More specifically, referring to FIG. 3A, broadcast receiver information is represented by two or more receiver information attributes constituting the distribution information class based on the multiplicity setting.

The receiver information has an addressee information attribute that identifies the device targeted as the receiver (device control services 73, 75), an output style sheet information attribute that identifies the output style sheet for converting to information suitable for the target device, an input style sheet attribute that specifies the input style sheet for converting to information suitable to the application 41 acting as the transmitter, a time limit attribute that is used as a standard for determining distribution errors, and a receiver information ("substitute receiver information" below) attribute related to the receiver ("substitute receiver" below) to which the information is alternatively distributed when the information is not distributed successfully.

It should be noted that the substitute receiver information includes the same components as the receiver information attribute of the distribution information class. More specifically, the receiver information attribute has a hierarchical structure, and the order of priority is determined according to the hierarchy. Therefore, when distribution based on the substitute receiver information attribute is not completed normally, distribution proceeds based on the substitute receiver information next-lowest in priority, and such substitution repeats.

Note that declaration of "class" and "attribute" is omitted below for brevity.

The distribution result is described next.

Figure 3B:
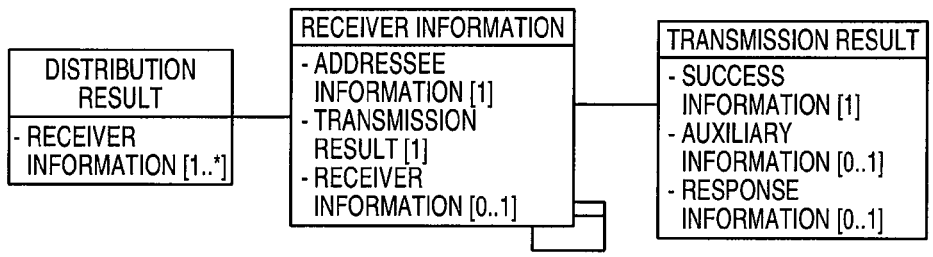
FIG. 3B is a domain model showing distribution results.

As shown in FIG. 3B, the distribution result has receiver information (main receiver information) related to one or more receivers to which distribution was attempted. The receiver information includes "address information" for identifying the target device designated as the receiver, the "transmission result" describing the result of transmission to the target device, and "receiver information (substitute receiver information)" related to the receiver (substitute receiver) to which the information is alternatively distributed when the information is not distributed normally.

The transmission result includes "success information" denoting whether transmission succeeded or not, "auxiliary information" denoting the status of the target device, and "response information" that is input data from the target device.

Figure 3C:
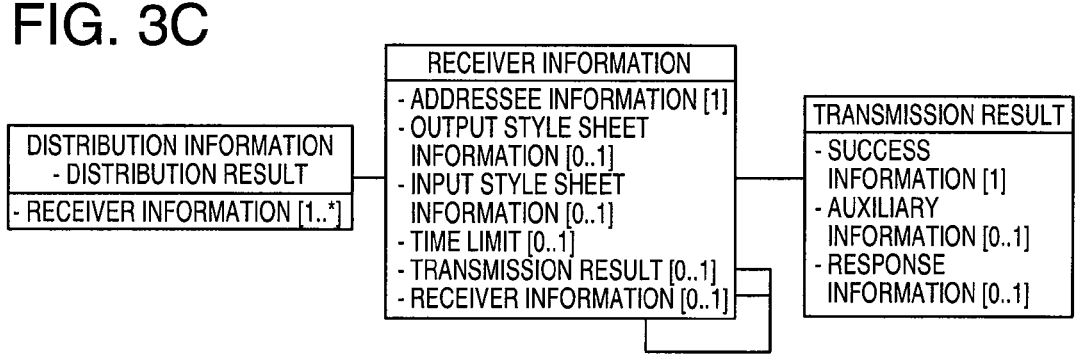
FIG. 3C is a domain model showing distribution information and distribution results.

Note that the distribution information and distribution result may be combined as shown in FIG. 3C. More specifically, the distribution result can be added to the data structure of the distribution information, and the request message schema (see FIG. 7) and the response message schema (see FIG. 11) can be combined into a single schema.

Figure 4:
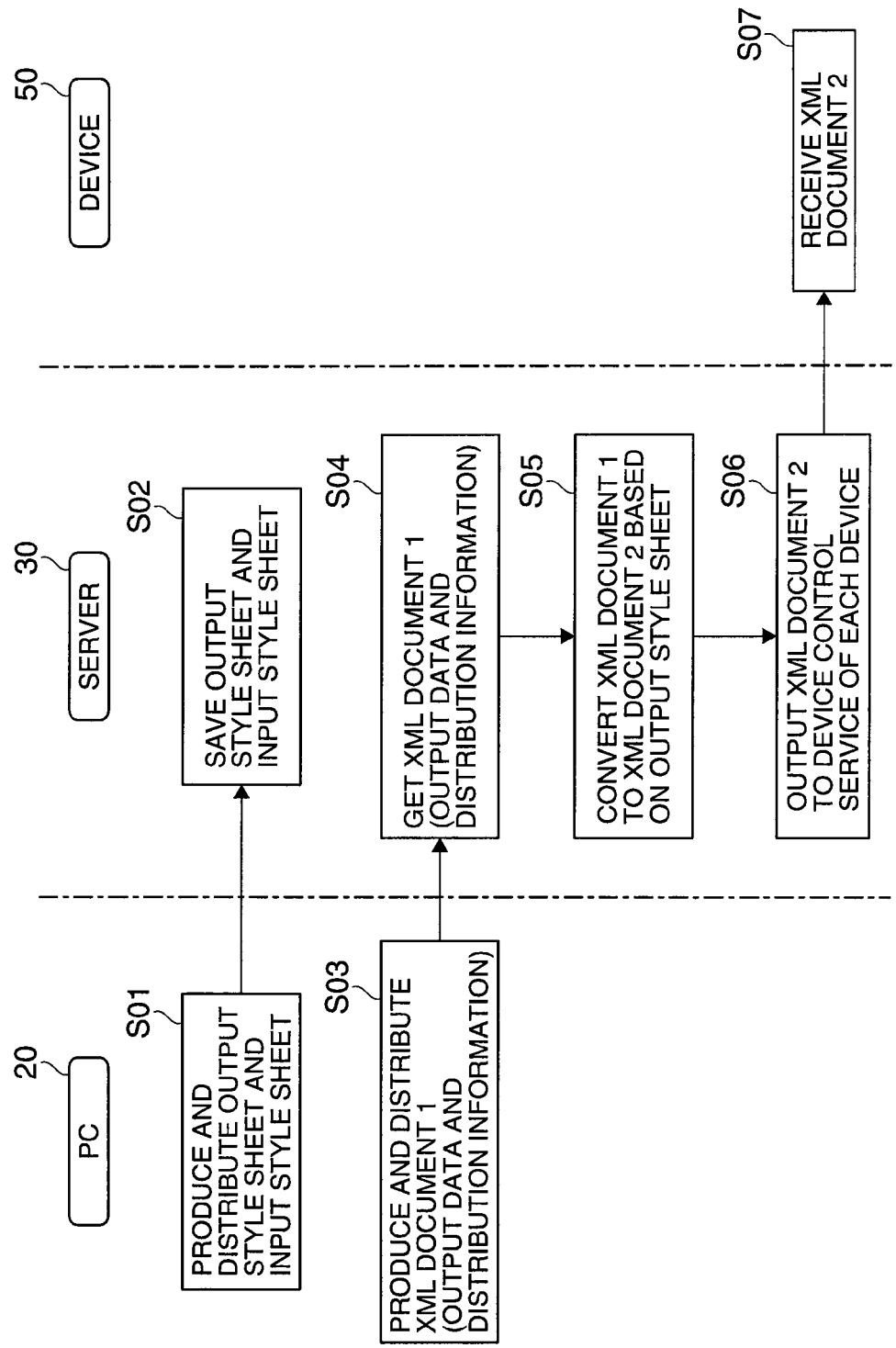
FIG. 4 is a flow chart of the information distribution process of the in-house management system.

The information distribution process and response process are described next with reference to FIG. 4 and FIG. 5. FIG. 4 is a flow chart showing the information distribution process of the in-house management system SY. As shown in the figure, the PC 20 (application 41) generates and sends an output style sheet and an input style sheet to the server 30 before starting the information distribution process (S01). The server 30 (style sheet management unit 71) stores these style sheets in the style sheet database 81 (S02).

The PC 20 generates output data in conjunction with acquiring order information from the order terminal 10, and sends the output data with the distribution information as XML document 1 to the server 30 (integrated device control service 44) (S03). Note that the distribution information may be transmitted before the output data is distributed.

The server 30 acquires the XML document 1 from the PC 20 (S04, communication interface 84), and converts XML document 1 to XML document 2 based on the previously stored output style sheet (S05, XML document converter 85).

In step S05 the output style sheet is specified by the output style sheet information contained in the receiver information of the distribution information. As a result, a different output style sheet can be applied to each receiver (device 50). Therefore, when the receiver is the kitchen printer 61, the XML document 1 can be converted to XML document 2 in XML-POS (an industry-standard XML document describing control information for POS devices), and when the receiver is the kitchen display 63, the XML document 1 can be converted to XML document 2, which is written in XHTML or other data display language.

While detailed description is omitted below, conditional expressions can also be included in each output style sheet. When a conditional expression is included in the output style sheet, XML document 1 is converted to XML document 2 only if the output data in the XML document 1 satisfies the conditional expression. In other words, if the output data in XML document 1 does not satisfy the conditional expression contained in the output style sheet, XML document 1 is not converted to XML document 2 and is not distributed. However, because different conditional expressions can be set according to the output style sheet, a conditional broadcast process can be configured that specifies two kitchen printers 61 as the receivers, outputs to the first kitchen printer 61 when the output data satisfies a particular condition, and outputs to the second kitchen printer 61 when the output data does not satisfy a particular condition.

The server 30 then outputs the XML document 2 after the conversion to the device control service 73, 75 of each device 50 (S06, device-specific XML document input/output unit 86). Note that the addressee (target device) is identified by the addressee information contained in the receiver information of the distribution information. The device 50 (device control services 73, 75) then acquires the XML document 2 from the server 30 (S07).

The response process of the in-house management system SY is described next with reference to the flow chart in FIG. 5.

The device 50 generates and sends to the server 30 an XML document 3 containing success information, auxiliary information, and response information as the distribution result to the XML document 2 acquired in S07 (S11). The server 30 receives the XML document 3 (S12, device-specific XML document input/output unit 86) and based on the previously stored input style sheet converts the XML document 3 to XML document 4 (S13, XML document converter 85). Note that the input style sheet is the style sheet specified by the input style sheet information contained in the receiver information of the distribution information and read from the style sheet database 81. As a result, when the server 30 is connected to a plurality of PCs 20 (application 41), conversion to the appropriate information format is possible using a different input style sheet for each application 41 (transmitter). Note that the server 30 can identify the PC 20 of the transmitter to the device 50 designated as the receiver using a transport protocol (such as a TCP/IP protocol).

When the server 30 sends XML document 2 to a plurality of devices 50, the distribution results (XML document 3) from the plural devices 50 are combined and converted to XML document 4. The server 30 then inputs the XML document 4 after conversion to the PC 20 that transmitted the XML document 1 (output data) (S14). The PC 20 (application 41) that was the transmitter thus acquires the XML document 4 input from the server 30 (S15).

Specific examples of the output data, distribution information, style sheet, and distribution result are described next with reference to FIG. 6 to FIG. 11.

FIG. 6 shows an example of the output data that is equivalent to the XML document 1. This example shows the output data generated when order information for one draft beer, one sirloin steak, and one caesar salad is acquired from the order terminal 10. As indicated by reference numeral 101, the output data contains information denoting a sequence number, item ID, and item name (food or beverage name). Note that in this example item IDs for drinks are in the 100 range, item IDs for the grill department are in the 200 range, and item IDs for the salad department are in the 300 range. The output data may also include such information as the restaurant name, date and time the order was placed, the ID of the order terminal 10, a code identifying the operator of the order terminal 10, the price (unit and total), and customer data (such as sex and approximate age).

FIG. 7 shows an example of the distribution information that is equivalent to XML document 1. This example contains receiver information for five kitchen printers 61. As indicated by reference numeral 111, in the first device class Kitchen-Printer1 is the main receiver, the substitute receiver therefore is KitchenPrinter2, and the substitute receiver therefore is KitchenPrinter3. Therefore, the data is first sent to Kitchen-Printer1. If a distribution error occurs, transmission to KitchenPrinter2 is attempted, and if a distribution error occurs with KitchenPrinter2, transmission to KitchenPrinter3 is attempted.

As indicated by reference numeral 112, KitchenPrinter4 is the main receiver in the second device class, and the substitute receiver therefore is KitchenPrinter5. Therefore, the data is first sent to KitchenPrinter4, and if a distribution error occurs, transmission to KitchenPrinter5 is attempted.

As indicated by reference numeral 113, the third device class has the same configuration as the second device class. Therefore, the data is first sent to KitchenPrinter6, and if a distribution error occurs, transmission to KitchenPrinter7 is attempted.

Note, further, that in this example the first device class relates to the kitchen printer 61 in the grill department, the second device class relates to the kitchen printer 61 in the salad department, and the third device class relates to the kitchen printer 61 in the drink department, and an output style sheet is specified for each of the devices 50 (departments). As also described above output style sheet information and a time limit are also specified for each receiver in the distribution information. Note, further, that the input style sheet information that can be included in the distribution information is not shown in FIG. 7 and description thereof is omitted.

FIG. 8A shows an example of the output style sheet produced for the kitchen printer 61 in the drink department. As indicated by reference numeral 121, this figure shows a style sheet for printing order content (that an order was received and the names and quantities of the ordered items) for items with an item ID (menu ID) in the 100 range. Note, further, that the <xsl:if test> class denoted by the wavy line is a conditional expression for applying this style sheet. Therefore, this style sheet is applied when the item ID contained in the output data is for an item in the 100 range. Furthermore, by applying this style sheet, XML document 2 is written in a printer language (XMLPOS) that can be interpreted by the POS terminal 51 connected to the kitchen printer 61.

FIG. 8B shows an example of XML document 2. FIG. 8B shows an example of XML document 2 when information is converted based on the output style sheet shown in FIG. 8A. More specifically, as indicated by reference numeral 122, XML document 2 describes a command for printing order content on a kitchen printer 61 in the drink department (that is, KitchenPrinter6 and KitchenPrinter7).

FIG. 9A shows an example of an output style sheet produced for the kitchen printer 61 in the grill department. As indicated by reference numeral 123, this figure shows a style sheet for printing order content for items with an item ID (menu ID) in the 200 range. Note also that the underlined part indicates the part that differs from the output style sheet shown in FIG. 8A, and is equivalent to a conditional expression for applying the output style sheet shown in FIG. 9A. Therefore, this style sheet is applied when the item ID contained in the output data is for an item in the 200 range.

FIG. 9B shows an example of XML document 2 when information is converted based on the output style sheet shown in FIG. 9A. More specifically, as indicated by reference numeral 124, XML document 2 describes a command for printing order content on a kitchen printer 61 in the grill department (that is, KitchenPrinter1, KitchenPrinter2, and KitchenPrinter3 in FIG. 7). Note that the underlined part indicates the part that differs from content of XML document 2 shown in FIG. 8B.

FIG. 10A similarly shows an example of an output style sheet produced for the kitchen printer 61 in the salad department. As indicated by reference numeral 125, this figure shows a style sheet for printing order content for items with an item ID (menu ID) in the 300 range. Note also that the underlined part shows the conditional expression, and this style sheet is applied when the item ID contained in the output data is for an item in the 300 range.

FIG. 10B shows an example of XML document 2 when information is converted based on the output style sheet shown in FIG. 10A. More specifically, as indicated by reference numeral 126, XML document 2 describes a command for printing order content on a kitchen printer 61 in the salad department (that is, KitchenPrinter4 and KitchenPrinter5 in FIG. 7).

FIG. 11 shows an example of the distribution result equivalent to XML document 4. The example shown in this figure corresponds to the distribution information shown in FIG. 7. More specifically, as indicated by reference numerals 131 to 133, the following content is described in this document. That is, "transmission to the main receivers KitchenPrinter1 and KitchenPrinter4 was attempted, KitchenPrinter1 did not find a device 50 and operation failed, and transmission to the substitute receiver KitchenPrinter2 was tried. However, KitchenPrinter2 timed out and operation failed. Transmission was therefore attempted to KitchenPrinter3, that is, the substitute receiver next lowest in priority, and operation was successful. KitchenPrinter4 and KitchenPrinter6 operated normally, and transmission to substitute receivers KitchenPrinter5 and KitchenPrinter7 was not attempted."

Note that the "transmission result" related to the distribution result shown in FIG. 3 is equivalent to the information between the <Device> and </Device> tags in FIG. 11. The "success information" in the transmission result shown in FIG. 3 is equivalent to the information between the <Response> and </Response> tags in FIG. 11, and the auxiliary information and response information in FIG. 3 are equivalent to the information between the <BusinessError> and </BusinessError> tags in FIG. 11.

The substitution process of the server 30 is described next with reference to FIG. 12 to FIG. 15.

As described above, the server 30 attempts to distribute the information to a substitute receiver when information cannot be correctly sent to the main receiver, but if the same information is sent it may not be possible to achieve the desired object, and it may not be possible to operate the substitute receiver correctly if the main receiver and substitute receiver are different types of devices 50. A process for solving this problem is described below.

Figure 12:
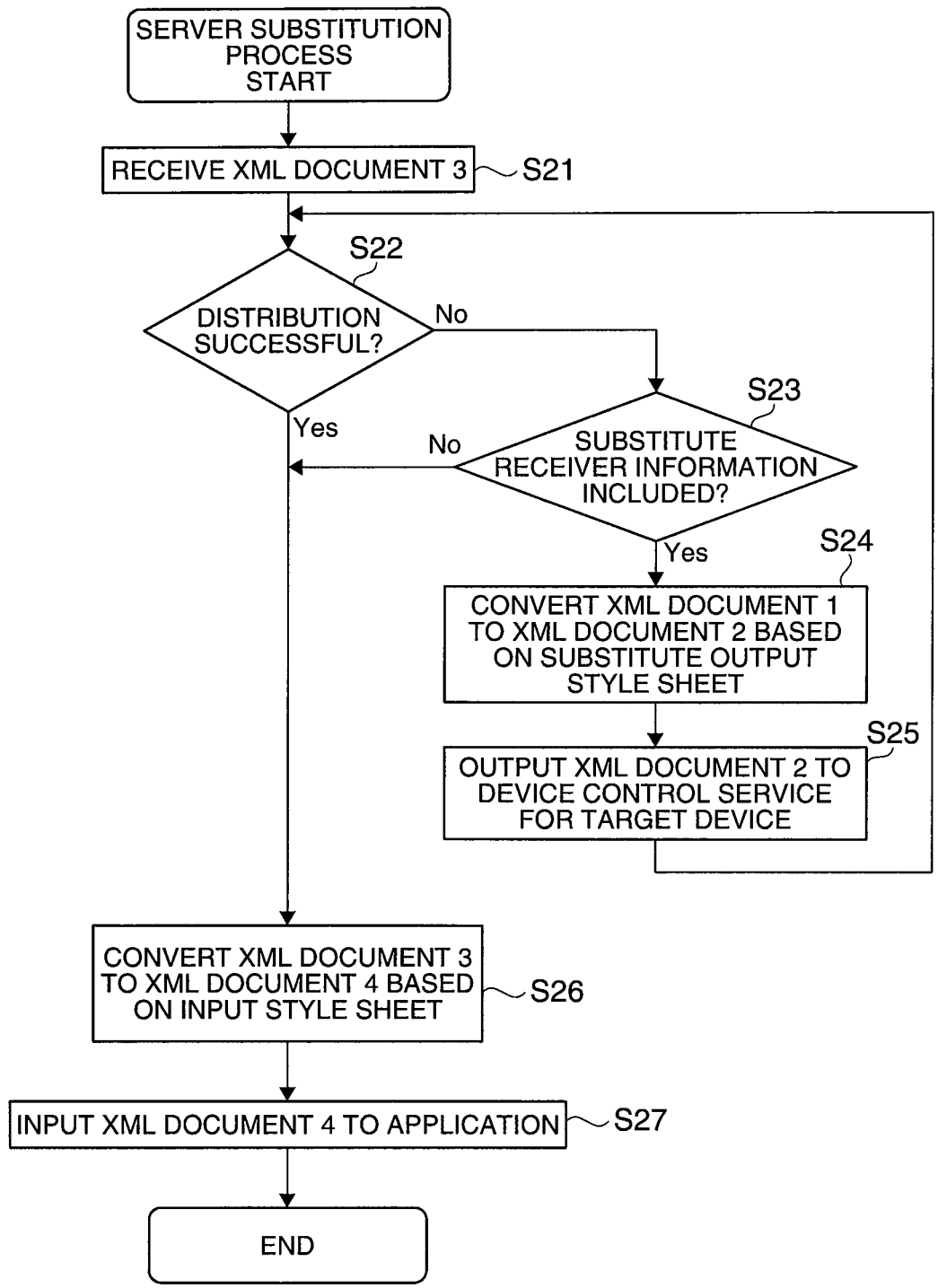
FIG. 12 is a flow chart of a server substitution process.

FIG. 12 is a flow chart of the substitution process of the server 30.

Figure 5:
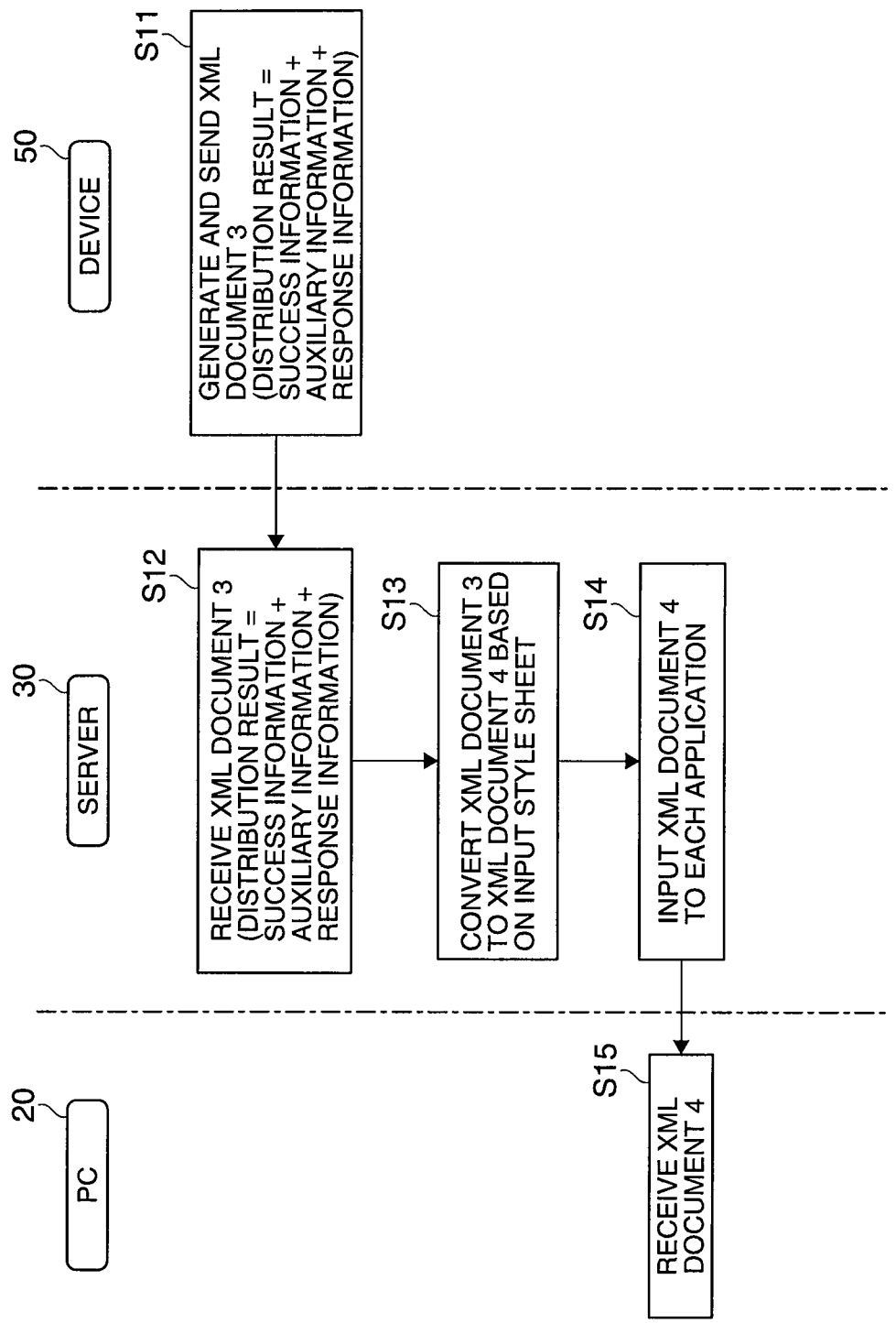
FIG. 5 is a flow chart of the response process of the in-house management system.

When the server 30 (integrated device control service 44) receives XML document 3 as a result of the response process in FIG. 5 (S21, equivalent to S12 in FIG. 5), whether information distribution was successful is determined (S22). If it is determined that the information was not distributed normally (S22 returns No), whether substitute receiver information is included in the distribution information is determined (S23). If substitute receiver information is included in the distribution information (S23 returns Yes), XML document 1 is converted to XML document 2 (S24, XML document converter 85) based on the output style sheet for the substitute receiver ("substitute output style sheet" below) and the resulting XML document 2 is output to the device control service 73, 75 of the target device designated as the substitute receiver (S25, device-specific XML document input/output unit 86).

Note that when information is distributed to a substitute receiver, whether information distribution was successful is determined (S22). If information distribution was not successful (S22 returns No), whether or not there is substitute receiver information for another substitute receiver with even lower priority is determined (S23), and if substitute receiver information is contained in the distribution information (S23 returns Yes), processing continues from step S24.

However, if it is determined that the information was distributed normally (S22 returns Yes), or if substitute receiver information is not contained in the distribution information (S23 returns No), XML document 3 describing the distribution result is converted to XML document 4 based on the input style sheet without distribution to a substitute receiver (S26, equivalent to S13 in FIG. 5), and the resulting XML document 4 is input to the application 41, that is, the transmitter (S27, equivalent to S14 in FIG. 5).

Specific examples of the substitute output style sheets are described next with reference to FIG. 13 to FIG. 15.

FIG. 13A shows an example of an output style sheet for outputting from the drink department to a kitchen printer 61 in another department (grill department or salad department), and is the substitute output style sheet when the output style sheet shown in FIG. 8 is the output style sheet for the main receiver (referred to below as the "main output style sheet").

Note, further, that in FIG. 13 to FIG. 15 the underlined parts indicate the parts that differ from the content of the output style sheet and XML document 2 shown in FIG. 8. It is therefore possible to generate a substitute output style sheet, and therefore execute the substitution process of this embodiment of the invention, by changing only the underlined parts (that is, without needing to change the application 41).

As indicated by reference numeral 141, the substitute output style sheet in FIG. 13A is a style sheet for printing with the order content a message requesting delivery to the drink department (the original intended receiver) based on an item with an item ID in the 100 range (conditional expression). In other words, if the kitchen printer 61 in the drink department is not operating normally because the paper ran out, for example, the content can be printed using a kitchen printer 61 in another department based on XML document 2 shown in FIG. 13B (see reference numeral 142). This enables personnel in another department to deliver the printout of the preparation instructions to the drink department so that kitchen work is not interrupted.

Note that the substitute output style sheet shown in FIG. 13A can also be used by kitchen printers 61 in other departments (the grill department or salad department in this example). In other words, it is not always necessary to prepare a different output style sheet for each device 50. In addition, instead of inserting additional information such as "please take to the drink department" into the order preparation ticket, the substitute output style sheet may be written to contain instructions for printing the additional information in the header of the page or on a separate instruction page.

FIG. 14A shows an output style sheet for controlling operation of cooking equipment 62 (drink dispenser) in the drink department. FIG. 15A shows an output style sheet for controlling operation of the kitchen display 63 in the drink department. Note that the output style sheet in FIG. 15 is the substitute output style sheet when the output style sheet shown in FIG. 14 is the main output style sheet.

As indicated by reference numeral 151, the output style sheet in FIG. 14A is a style sheet for instructing the drink dispenser to poor the item (drink) with an item ID in the 100 range (conditional expression) into a glass. The XML document 2 (see reference numeral 152) shown in FIG. 14B can be generated based on this output style sheet. Note that XML document 2 is written in a language that can understood by the protocol converter 52 (see FIG. 1).

As indicated by reference numeral 161, the output style sheet in FIG. 15A is a style sheet for causing the kitchen display 63 to display the order content for an item (drink) with an item ID in the 100 range (conditional expression) on the kitchen display 63. The XML document 2 (see reference numeral 162) shown in FIG. 15B can be generated based on this style sheet. Note that XML document 2 is written in a language (XHTML) that can understood by the kitchen display 63.

As a result, if the drink dispenser does not function properly due, for example, to an equipment failure, the same objective (responding to a drink order) can be achieved using the kitchen display 63 as shown in FIG. 14 and FIG. 15. That is, by adding receiver information to the distribution information, and generating a substitute style sheet overwriting the underlined portion, the same object can be achieved using a different type of device 50, and there is no need to change the application 41 at all.

As described above, the in-house management system SY according to this embodiment of the invention can absorb changes in process content and differences in the type and specifications of the devices 50 by style sheets, and can therefore render direct control of devices by the application 41 unnecessary. Writing the application 41 is thus easier, and changing the application 41 due to changes in process content or device 50 replacement can be made unnecessary.

Furthermore, because two different device control services 73, 75 corresponding to existing device 50a and new device 50b can be called by the device-specific XML document input/output unit 86, changing the application 41 due to replacement of an existing device 50a with a new device 50b can be made unnecessary.

Furthermore, by writing the output data, distribution information, and distribution result in XML, they can be easily edited using a simple text editor, and there is no need to create new data conversion rules other than in XSL.

Furthermore, by writing the device-specific service information (information related to device control services 73, 75) in WSDL, Web services can be easily included.

Yet further, by using XMLPOS as a printer language, more than thirty different types of POS devices can be controlled regardless of manufacturer.

Furthermore, because an input style sheet can be specified for each application 41, that is, transmitter, the integrated device control service 44 can acquire the XML document 4 (distribution result) for a particular application 41 even when the integrated device control service 44 is called by a plurality of applications 41.

Furthermore, because the output style sheet can contain conditional expressions, distribution of the output data can be restricted. As a result, distribution of the output data can be restricted to only when the item ID associated with a certain department is included in the output data.

In addition, because the conditional expressions can be set specifically for a particular output style sheet (for a particular device), a conditional broadcast process can be constructed by setting plural devices 50 as the receiver.

Furthermore, because information is distributed based on substitute receiver information when information is not distributed normally based on the main receiver information, operation can be normally controlled even when the specifications of the first receiver and the substitute receiver differ.

In addition, because the description language used to write XML document 2 can be specified in the output style sheet, plural different devices 50 that can understand different description languages can be addressed. As a result, the devices 50 can be easily interchanged as needed according to the system configuration of a particular business.

It should be noted that while an in-house management system SY is described by way of example in the embodiment described above, the server 30 (integrated device control service 44) according to this embodiment of the invention can also be adapted to other environments. For example, when the server 30 according to this embodiment of the invention is deployed in a sales promotion management system having an e-mail transmitting device, page printer, large format printer, electronic shelf labels, and a POS computer as devices 50, customers interested in clearance items may be extracted from a customer database when triggered by receiving clearance sale information, and the sale information can be sent to the e-mail transmitter. In this scenario coupon information is attached to mail sent to premium customers, and if transmission to a first e-mail address fails, the mail is resent to a second e-mail address (substitution process). Direct mail for sending by post, for example, is printed by the page printer for customers without a registered e-mail address, and POP materials with sale information are printed on the large format printer. A command to change the product price to the sale price is also output to the electronic shelf label, and another command to update the product price stored in the master price list is sent to the POS computer.

An example of a conditional expression used in the foregoing embodiment is that an item ID for an item in the addressed department is contained in the output data, but other conditions, such as "customer information indicating a male customer is contained in the output data" or "time/date information denoting a midnight time period is contained in the output data," may also be defined. The conditional expression is also not limited to content contained in the output data, and the conditional expression may be set based on factors related to the output data, such as "the output data exceeds a specified size" or "the output date/time of the output data meets specific conditions."

The <xsl:if test> class is shown by way of example as a conditional expression in the foregoing embodiment (see FIG. 8A), but the invention is not so limited and other classes, such as <xsl:choose> and <xsl:template>, may also be used.

The substitution process for switching between identical devices is described in the foregoing embodiment, but may also be used for transferring information between POS terminals 51. For example, if a POS terminal 51 fails in a supermarket that has plural POS terminals 51, a receipt bearing the ID of the originating POS terminal 51 could be issued from the printer of a neighboring POS terminal 51 designated as the substitute receiver.

The substitution process for switching between different types of devices described in the foregoing embodiment may also be used to issue coupons. For example, when an electronic value reader/writer or point card reader/writer (a device that issues an electronic coupon) fails, coupons can be issued from a coupon printer (a device that prints a paper coupon) that is specified as the substitute receiver. Services using the integrated device control service 44 can also be provided in various other environments.

Elements of the server 30 and PC 20 described in the foregoing embodiment can also be rendered as programs. These programs can be supplied stored on various kinds of media, including CD-ROM and flash memory devices. More specifically, a program causing a computer to function as elements of the server 30 and PC 20, and recording media storing said program, are also included in the scope of the invention. It will be obvious to one with ordinary skill in the related art that other changes are also possible without departing from the scope of the accompanying claims. Such variations are not to be regarded as a departure from the spirit and scope of the invention, and all such modifications as would be obvious to one skilled in the art are intended to be included within the scope of the following claims.

What is claimed is:

1. An information distribution server that distributes information acquired from a transmitter to a first receiver and a second receiver, comprising:
   a storage unit that stores a first output style sheet for the first receiver and a second output style sheet for the second receiver, which are information conversion rules including a conditional expression related to information distribution;
   an output data acquisition unit that acquires output data from the transmitter;
   a receiver information acquisition unit that acquires receiver information from the transmitter specifying a first address of the first receiver and a second address of the second receiver and specifying the first output style sheet corresponding to the first receiver and the second output style sheet corresponding to the second receiver;
   a condition evaluation unit that determines whether or not the output data satisfies the conditional expression contained in the first output style sheet specified by the receiver information; and
   a distribution unit that distributes converted output data, which is the output data converted based on the first output style sheet, to the first address specified by the receiver information when the output data satisfies the conditional expression in the first output style sheet, wherein
   the distribution unit does not distribute the converted output data to the first address specified by the receiver information when the output data does not satisfy the conditional expression in the first output style sheet,
   the first output style sheet and the second output style sheet include different conditional expressions, and
   the receiver information has a hierarchical structure indicating an order priority of receivers for distributing converted output data.

2. The information distribution server described in claim 1, wherein:
   the receiver information specifies an input style sheet of information conversion rules corresponding to the transmitter,
   the information distribution server distributes converted input data, which is the input data from the first receiver converted based on the input style sheet, to the transmitter, and
   the transmitter acquires the converted input data.

3. The information distribution server described in claim 2, wherein:
   the output data acquisition unit can acquire output data from a plurality of transmitters; and
   the storage unit stores a plurality of input style sheets corresponding to the plural transmitters.

4. The information distribution server described in claim 3, wherein:
   the transmitter is an application;
   the receiver is a device; and
   the output data, converted output data, the input data, and the converted input data are markup documents.

5. The information distribution server described in claim 1, wherein:
   the first output style sheet and the second output style sheet convert the output data to converted output data in different description languages; and
   the first receiver and the second receiver are devices that can interpret different description languages.

6. The information distribution server described in claim 1, wherein:
   when the output data does not satisfy the conditional expression in the first output style sheet, the output data is not converted based on the first output style sheet.

7. The information distribution server described in claim 1, wherein:
   when the output data does not satisfy the conditional expression in the first output style sheet, the distribution unit distributes the converted output data to the second address of the second receiver specified by the receiver information.

8. The information distribution server described in claim 1, wherein when the condition evaluation unit determines that the output data does not satisfy the conditional expression in the first output style sheet, the condition evaluation unit determines whether or not the output data satisfies a second conditional expression in the second output style sheet.

9. A service-providing method comprising:
    acquiring output data from a transmitter and receiver information from the transmitter specifying a first address of a first receiver and a second address of a second receiver and specifying a first output style sheet corresponding to the first receiver and a second output style sheet corresponding to the second receiver;
    determining whether or not the output data satisfies a conditional expression contained in the first output style sheet specified by the receiver information; and
    distributing converted output data, which is the output data converted based on the first output style sheet, to the first address specified by the receiver information when the output data satisfies the conditional expression in the first output style sheet, wherein
    the converted output data is not distributed to the first address specified by the receiver information when the output data does not satisfy the conditional expression in the first output style sheet,
    the first output style sheet and the second output style sheet include different expressions, and the receiver information has a hierarchical structure indicating an order of priority of receivers for distributing converted output data.

10. The service-providing method described in claim 9, wherein:
    when the output data does not satisfy the conditional expression in the first output style sheet, the output data is not converted based on the first output style sheet.

11. The service-providing method described in claim 9, further comprising:
    distributing a second converted output data, which is the output data converted based on the second output style sheet, to the second address of the second receiver specified by the receiver information when the output data does not satisfy the conditional expression in the first output style sheet.

12. The service-providing method described in claim 9, wherein
    when the output data is determined not to satisfy the conditional expression in the first output style sheet, determining whether or not the output data satisfies a second conditional expression in the second output style sheet.

13. A non-transitory computer-readable medium having a program stored thereon that causes a computer to execute the service-providing method described in claim 9.

* * * * *